United States Patent
Lee

(10) Patent No.: US 7,991,578 B2
(45) Date of Patent: Aug. 2, 2011

(54) METHOD AND APPARATUS FOR FINDING CLUSTER IN DATA STREAM AS INFINITE DATA SET HAVING DATA OBJECTS TO BE CONTINUOUSLY GENERATED

(76) Inventor: Won-Suk Lee, Seoul (KR)

( * ) Notice: Subject to any disclaimer, the term of this patent is extended or adjusted under 35 U.S.C. 154(b) by 526 days.

(21) Appl. No.: 12/038,649

(22) Filed: Feb. 27, 2008

(65) Prior Publication Data

US 2009/0112514 A1    Apr. 30, 2009

(30) Foreign Application Priority Data

Oct. 31, 2007 (KR) .................. 10-2007-0110099

(51) Int. Cl.
  *G06F 17/18* (2006.01)
  *G06F 19/00* (2006.01)
(52) U.S. Cl. ......... 702/179; 702/180; 702/181; 702/189
(58) Field of Classification Search ........... 702/179–189
See application file for complete search history.

(56) References Cited

U.S. PATENT DOCUMENTS

| | | | | |
|---|---|---|---|---|
| 5,341,439 A | * | 8/1994 | Hsu | 382/103 |
| 7,389,208 B1 | * | 6/2008 | Solinsky | 703/2 |
| 2003/0187867 A1 | * | 10/2003 | Smartt | 707/102 |

\* cited by examiner

*Primary Examiner* — Andrew Schechter
*Assistant Examiner* — Phuong Huynh

(57) ABSTRACT

A method of finding a cluster in a data stream includes updating statistical distribution information of a grid-cell corresponding to a currently generated data element, statistical distribution information on previously generated data elements being managed using grid-cells, which are partitioned within the range of a data space and have statistical distribution information of data elements within the range; comparing the occurrence frequency of the data element in the grid-cell according to the update result with a predefined partitioning threshold, partitioning the grid-cell into a plurality of grid-cells according to the comparison result, and estimating statistical distribution information of the partitioned grid-cells; recursively performing the updating or comparing step until the grid-cell becomes a unit grid-cell; and comparing the occurrence frequency of a data element in the unit grid-cell with a predefined minimum support and defining a set of unit grid-cells as a cluster according to the comparison result.

23 Claims, 11 Drawing Sheets

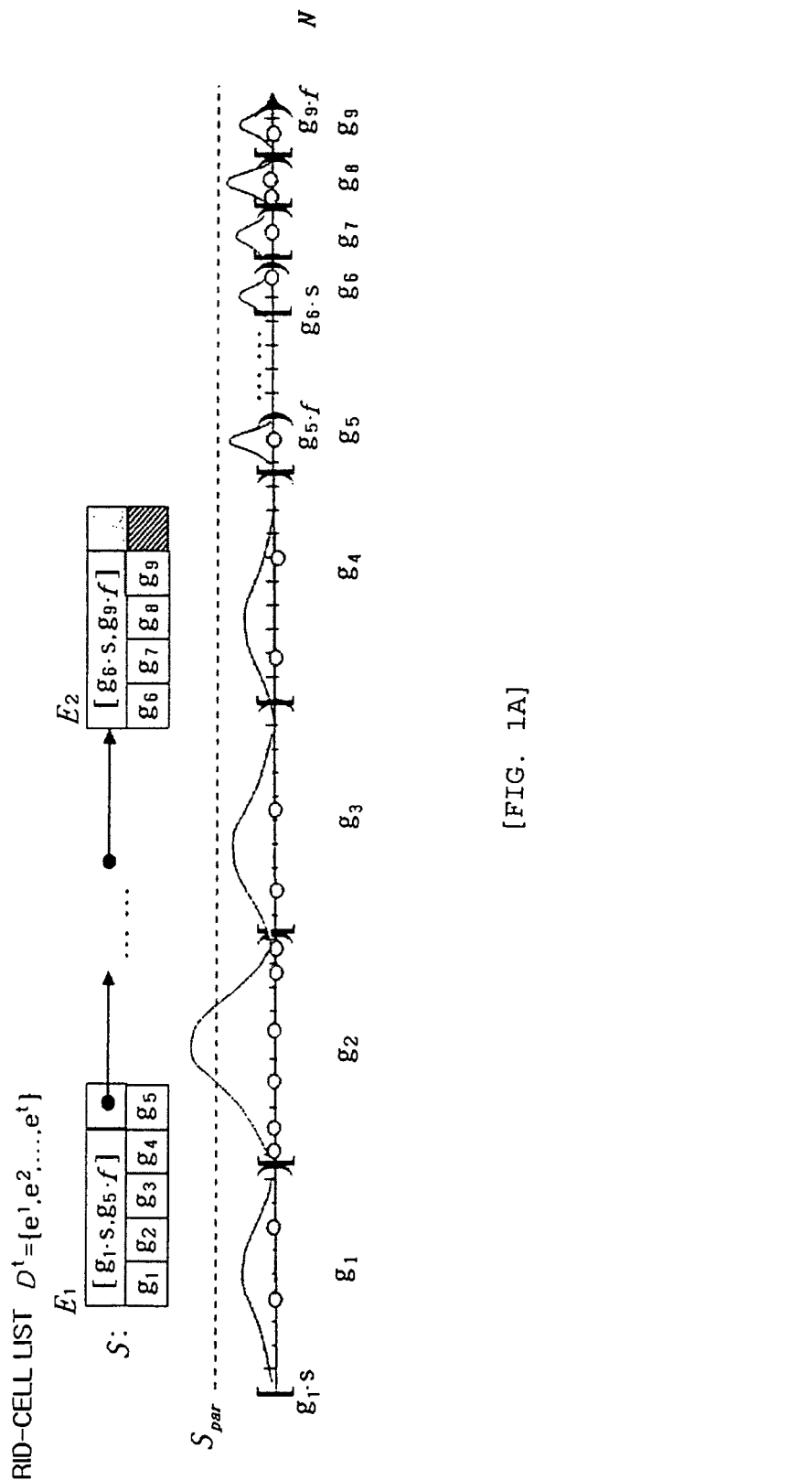
[FIG. 1A]

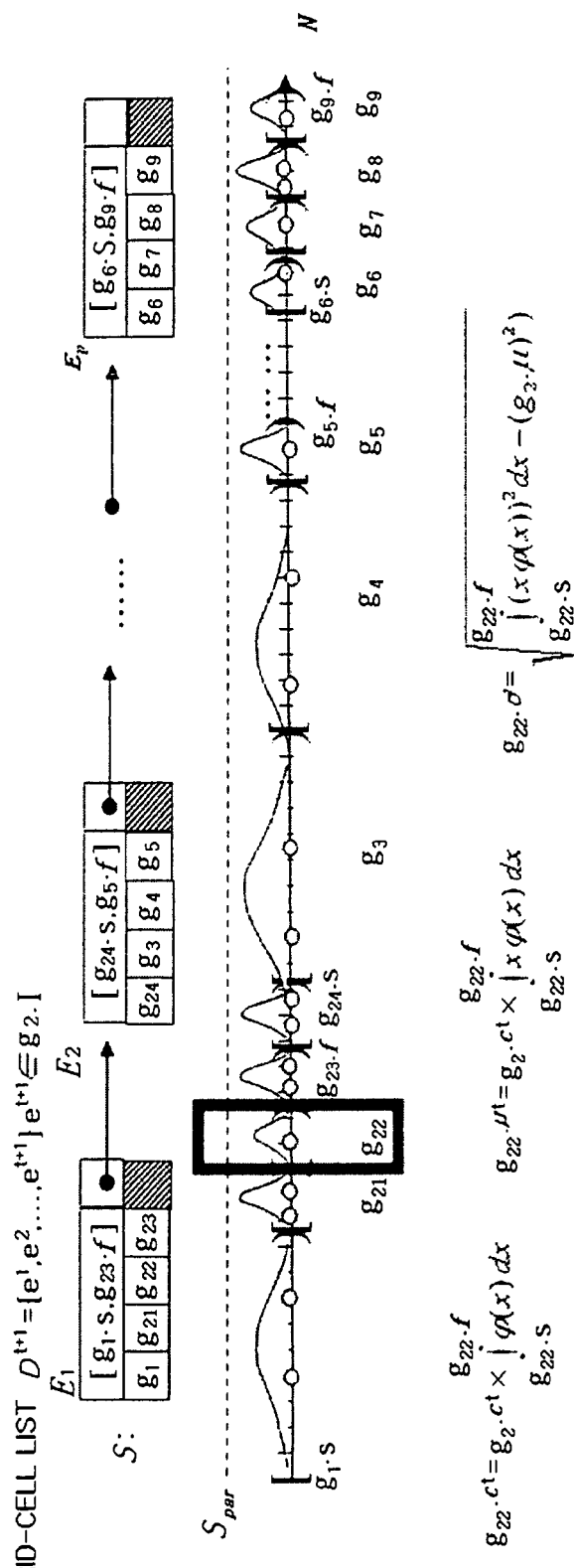
[FIG. 1B]

[FIG. 2A]
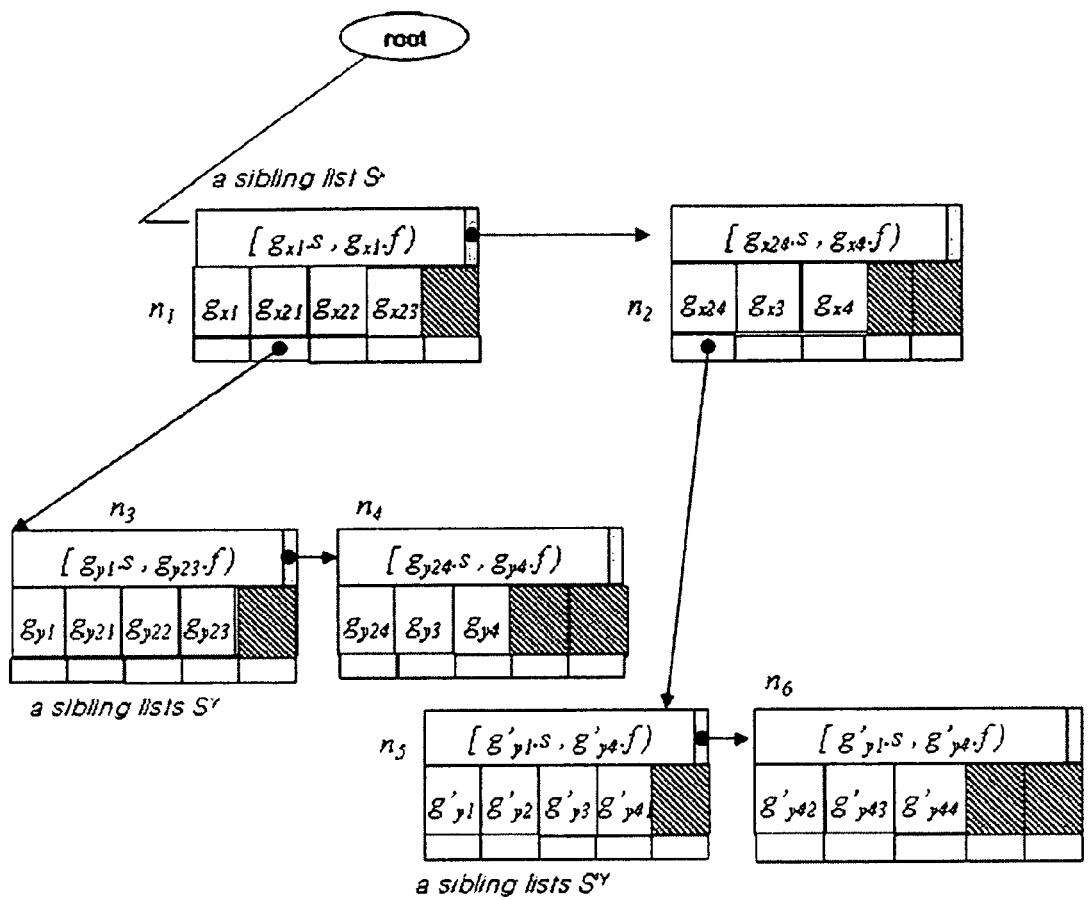

[FIG. 2B]
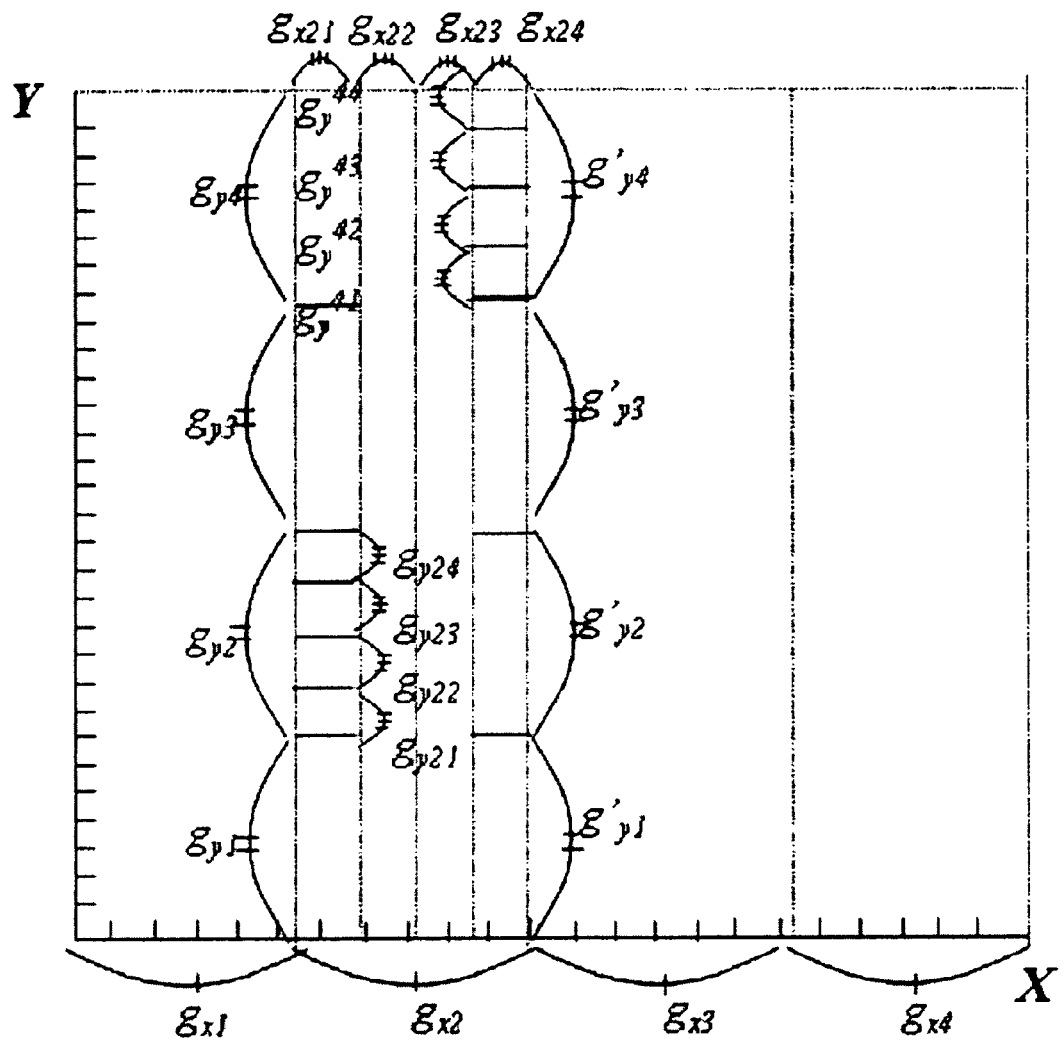

[FIG. 3]
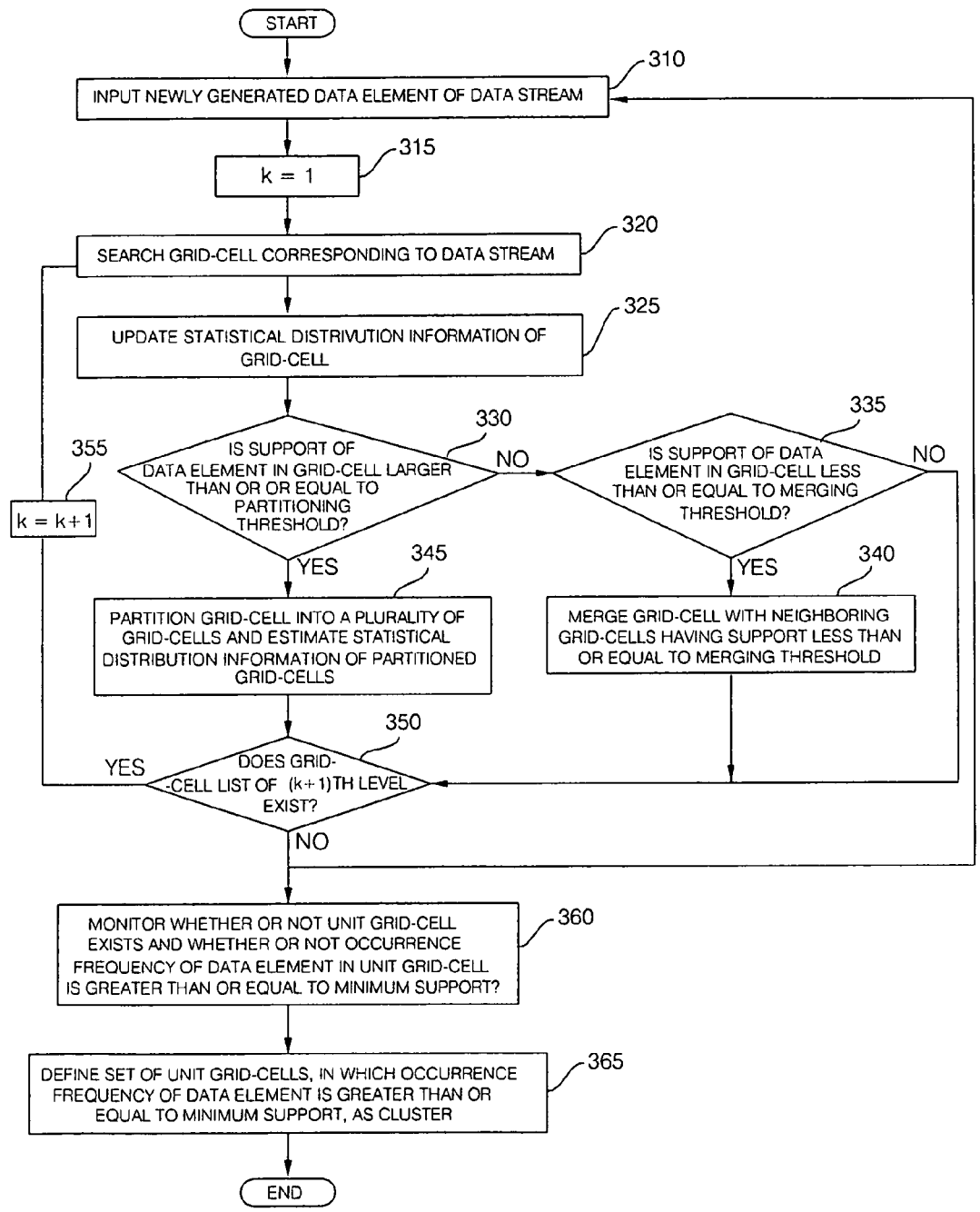

[FIG. 4]
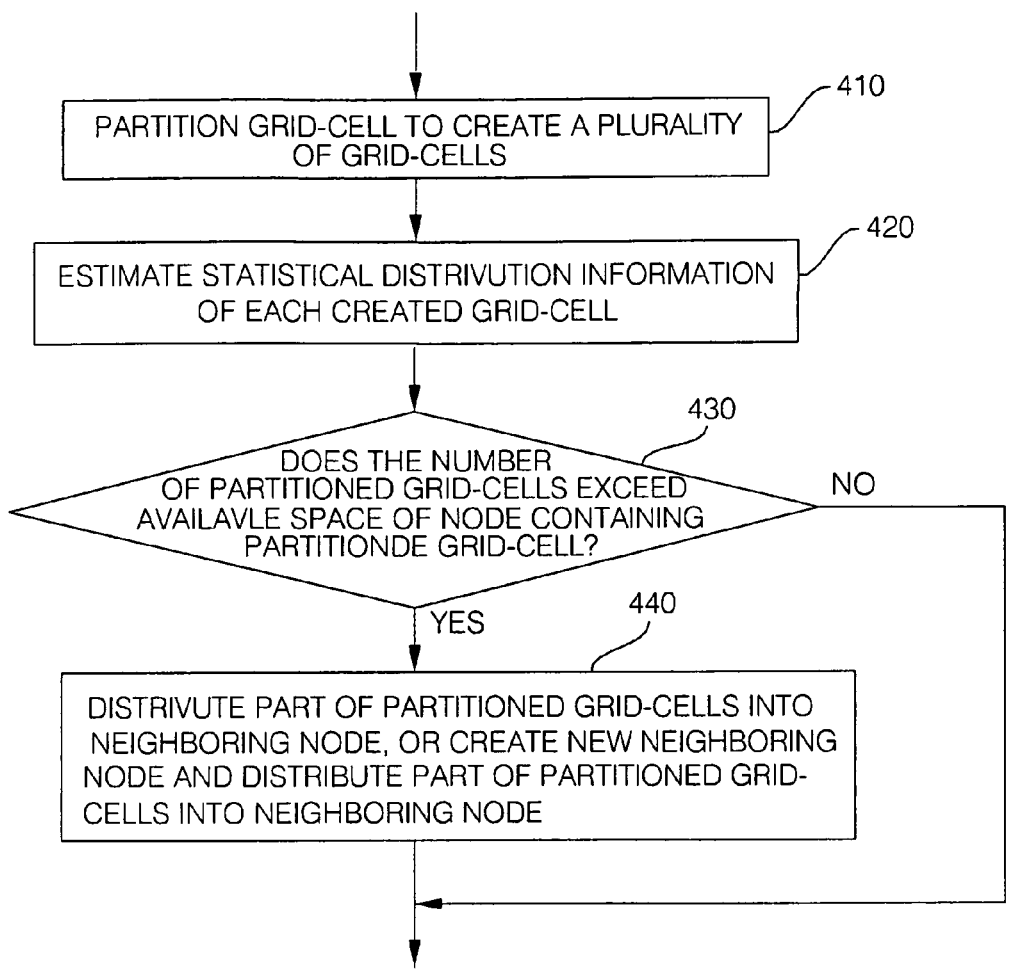

[FIG. 5]
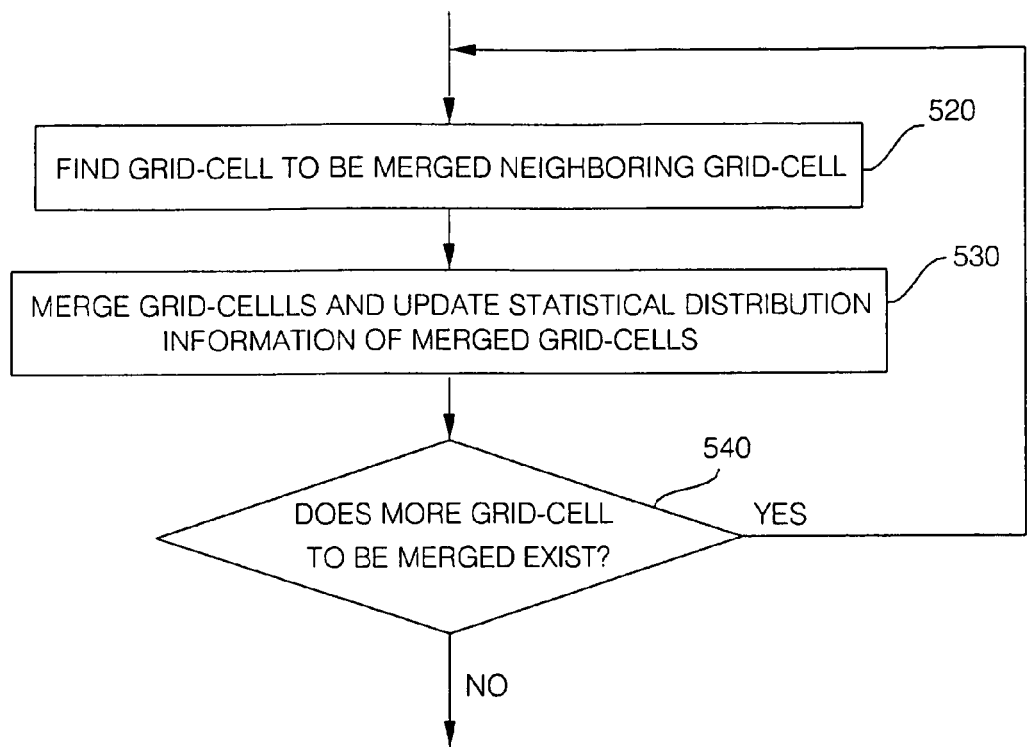

[FIG. 6]
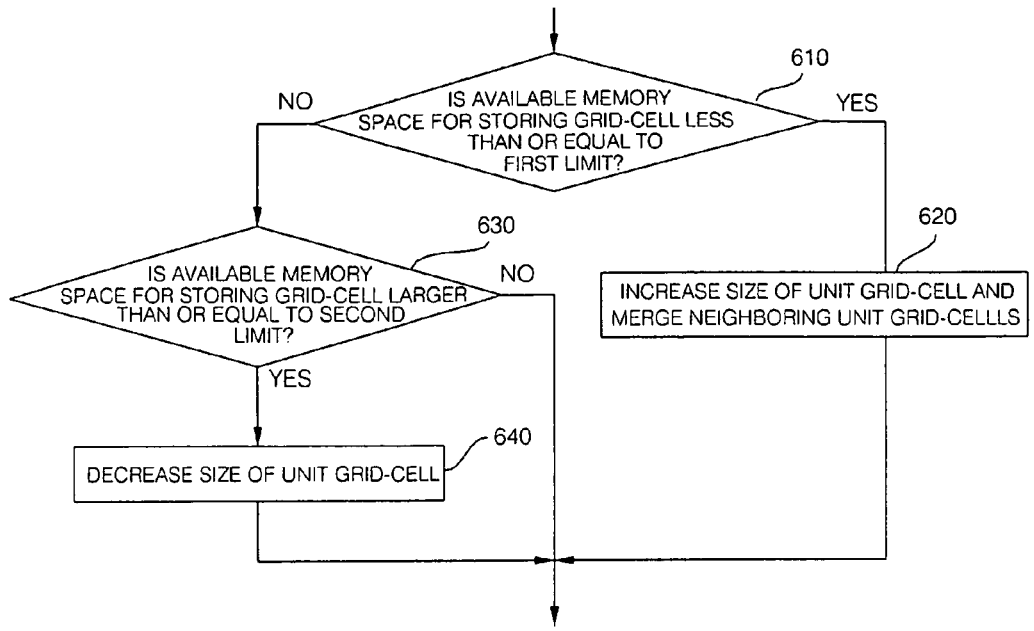
[FIG. 7]
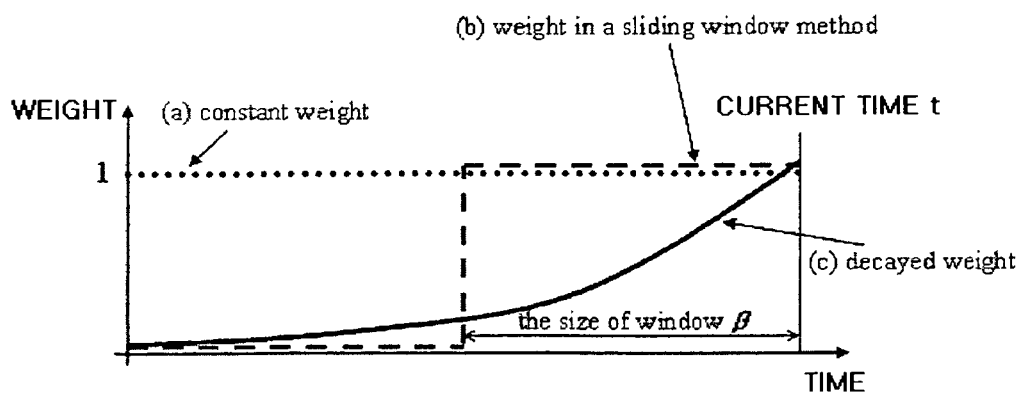

[FIG. 8A]
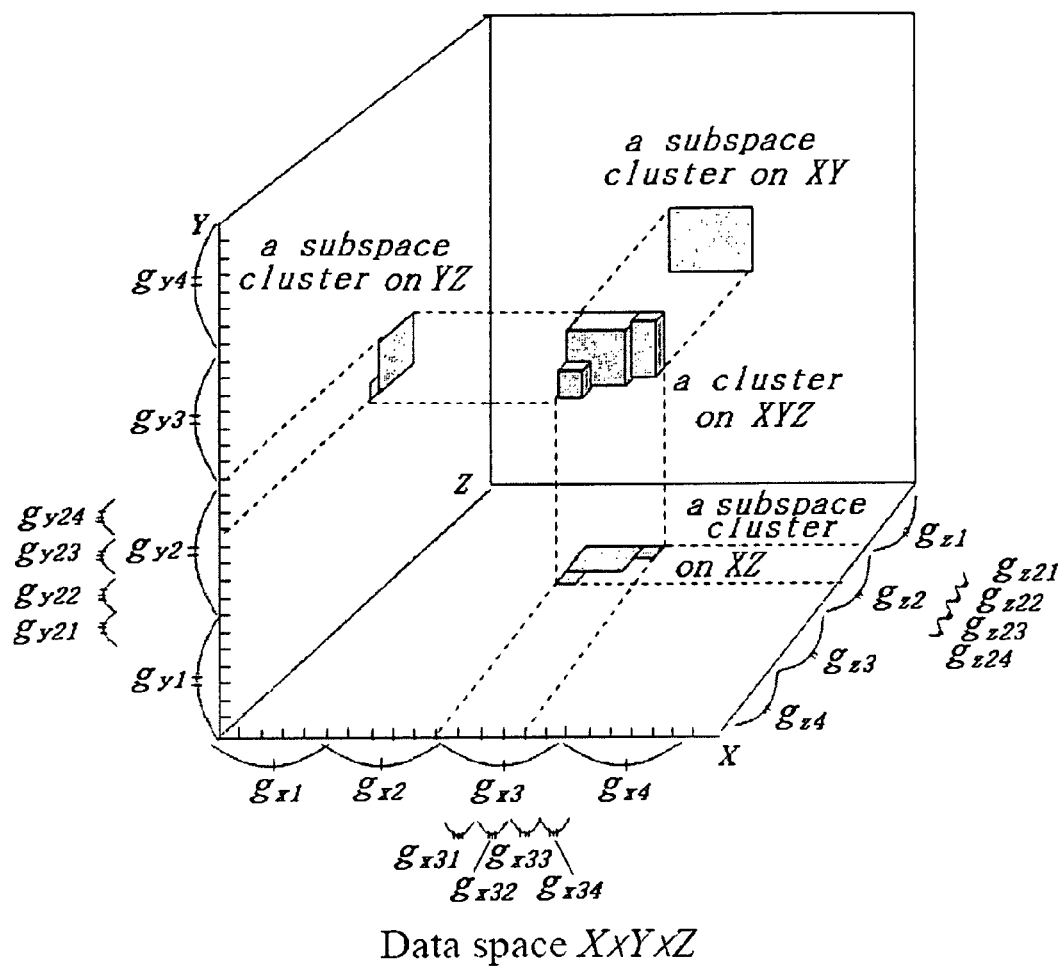
Data space $X \times Y \times Z$

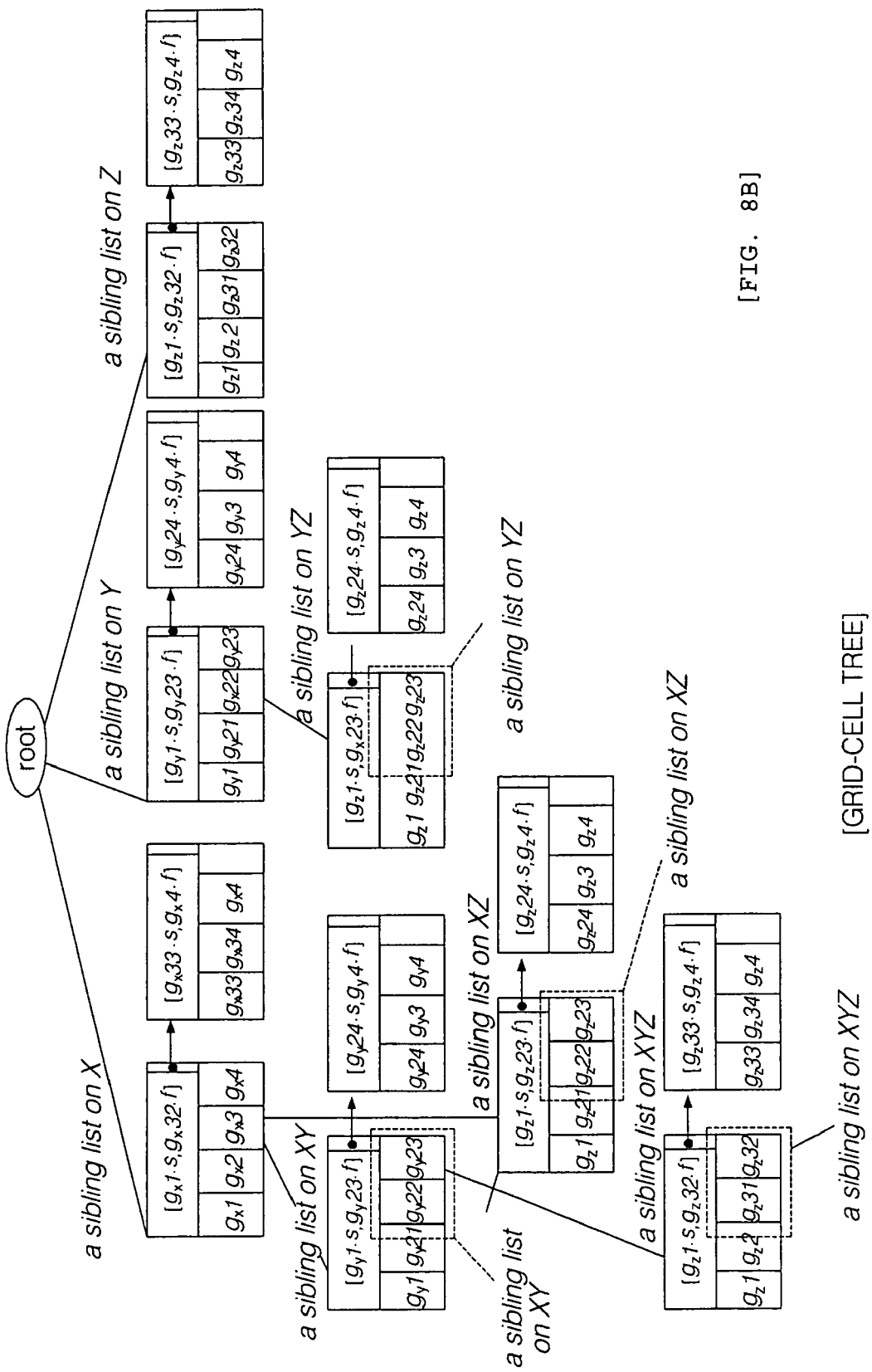
[FIG. 8B]
[GRID-CELL TREE]

[FIG. 9]
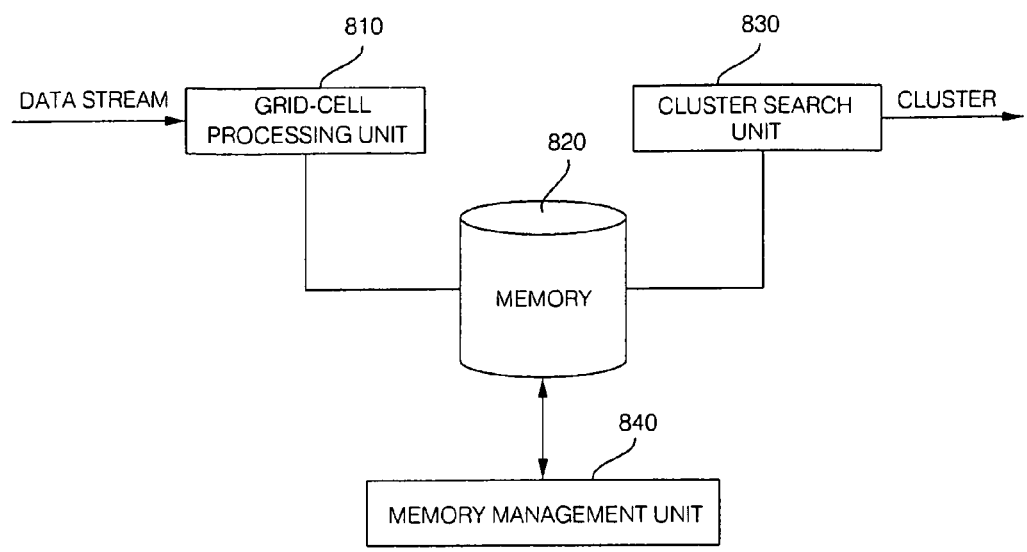

METHOD AND APPARATUS FOR FINDING CLUSTER IN DATA STREAM AS INFINITE DATA SET HAVING DATA OBJECTS TO BE CONTINUOUSLY GENERATED

BACKGROUND OF THE INVENTION

1. Technical Field

The present invention relates to a data mining technique that analyzes a massive data set to find desired information, and in particular, a method and apparatus for finding a cluster in a data stream as an infinite data set having data elements to be continuously generated.

2. Related Art

Recently, with the increase of application environments that process massive real-time data, such as Web surfing logs, communication logs, real-time movie data, and real-time stock trading, data stream analysis is increasingly needed. For this reason, there have been many researches on data mining for the data stream analysis.

Clustering is one of data mining analysis algorithms, in which multiple data elements are classified into similar groups by a given similarity measure. Clustering has been efficiently used in various applications, such as satellite image analysis, customer analysis for target marketing, and massive log analysis for unauthorized access detection.

For a finite data set, most of the existing clustering algorithms minimize the processing time and the memory usage while maintaining the accuracy of the analysis result. Although the clustering algorithms have been used in various applications, there are few clustering algorithms that are used to process a massive data set.

The known clustering methods have the following technical limitations.

The known techniques are designed to predefine a target data set before data mining, such that the analysis result can be efficiently obtained only when basic statistical preprocessing analysis can be performed on the target data set. However, the knowledge in the data set changes as time goes by, and in an environment where the data set is continuously increased, it is not possible to finitely define a data set. The known data mining system is to provide analysis information of a fixed data set. Accordingly, it is not possible to rapidly provide a user with a change in the analysis information when new data is added and the data set is changed.

In the known techniques, it takes a lot of time to obtain an analysis result including latest information in the data set, which is continuously increased. That is, in an environment where new data elements are continuously generated, when the data set is expanded, the previous analysis result becomes old information, and it is not useful as latest information, which includes information on the entire data set, in which a new data element is generated until recently. In addition, to obtain the analysis result including a data set, in which new data elements are generated, part or all of the previous data set and newly generated data elements need to be clustered again. Accordingly, mining is inevitably performed several times, and the size of the data set becomes large, which makes the processing time longer.

In addition, the known techniques have a limitation to obtain a cluster in real time. Upon clustering, a real-time processing capability refers to a capability to rapidly obtain the analysis result within a limited time. The known technique takes accurate information analysis on a data set to be analyzed into consideration, and thus there is a limitation to support a fast processing time. In particular, since the data set needs to be recursively read several times, in the environment where a data set is continuously increased, the previous data elements need to be separately stored, and it takes a lot of time to obtain the analysis result including information on a data set, in which a new data element is generated. For this reason, there is a limitation to obtain the analysis result in real time. That is, it is designed such that, when a new data element is generated, the clustering result can be obtained only by analyzing the entire data set. Therefore, the clustering result when a new data element is added cannot be provided in real time.

In the known techniques, to find clusters in a limited memory space, the memory usage required for clustering can be predicted in advance on an assumption that a data set is predefined. However, in case of the real-time data mining in the data stream environment, since a data set is not predefined, and data is continuously increased, the required memory usage cannot be predicted in advance.

SUMMARY OF THE INVENTION

The present invention has been finalized in order to solve the drawbacks inherent in the related art. It is an object of the present invention to provide a method and apparatus for finding a cluster in a data stream, which is capable of efficiently providing clusters and subclusters from the data stream in real time with a limited memory space in a data stream environment containing a set of data elements, which are continuously generated, to thereby meet changes in application environments and demands, and a computer-readable recording medium having recorded thereon a program, which executes the method of fining a cluster in a data stream.

According to an aspect of the present invention, there is provided a method of finding a cluster in a data stream as an infinite data set having data elements, which are continuously generated. The method includes the steps of: (a) updating statistical distribution information of a grid-cell corresponding to a currently generated data element among the grid-cells, statistical distribution information on previously generated data elements being managed using grid-cells, which are partitioned according to the range of a data space and have statistical distribution information of data elements within the range; (b) comparing the occurrence frequency of the data element in the grid-cell according to the update result of the statistical distribution information with a predefined partitioning threshold, partitioning the grid-cell into a plurality of grid-cells according to the comparison result, and estimating statistical distribution information of the partitioned grid-cells; (c) recursively performing the step (a) or (b) until the grid-cell becomes a unit grid-cell having a predefined size; and (d) comparing the occurrence frequency of a data element in the unit grid-cell with a predefined minimum support and defining a set of a plurality of unit grid-cells as a cluster according to the comparison result.

The statistical distribution information of the data elements may be managed using the grid-cells, nodes containing the grid-cells, and a grid-cell list, in which the nodes are connected with each other.

When the data space is an n-dimensional data space (where $n \geq 2$), the grid-cell list may exist for each level in each dimension. The step (c) may include, if a grid-cell in a grid-cell list corresponding to a k level (where $1 \leq k \leq n-1$) becomes the unit grid-cell, a substep of creating a node corresponding to a (k+1) level as a child of the unit grid-cell. The grid-cell corresponding to the k level may manage distribution statistics of data elements within the range of a k-dimensional data space where the range of its data space intersects grid-cells in a path from the root to the node containing it.

The node may include information about the range of a data space corresponding to each grid-cell therein, a pointer to a node connected thereto, and a pointer to its child node.

The step (b) may include, when the number of partitioned grid-cells exceeds a memory space of a node containing the partitioned grid-cells, a substep of creating a new node and distributing the partitioned grid-cells into the nodes.

The method may further include a step of comparing the occurrence frequency of the data element in the grid-cell according to the update result of the statistical distribution information at the step (a) with a predefined merging threshold and merging the grid-cell with neighboring grid-cells according to the comparison result.

The method may further include a step of comparing the occurrence frequency of the data element in the grid-cell with a predefined merging threshold periodically or according to a memory space for storing the grid-cell and merging the grid-cell with neighboring grid-cells according to the comparison result.

In the step (a), a decay rate may be applied to the currently generated data element to update the statistical distribution information such that the weight of the recently generated data element becomes larger than the weight of the previously generated data element.

The method may further include a step of comparing a memory space for storing the grid-cell with a first predefined limit and increasing the predefined size at the step (c) according to the comparison result, or comparing the memory space for storing the grid-cell with a second predefined limit and decreasing the predefined size according to the comparison result.

When the data space is an n-dimensional data space (where $n \geq 2$), a subcluster that is a cluster in a sub-data space, which is a data space formed by a subset of n dimensions, may be found.

When the subcluster is found, in a predefined dimension sequence of n dimensions, a grid-cell list may exist for each dimension in a first level. The step (c) may further include, if a grid-cell in a grid-cell list for dimension v (where $k \leq v \leq n$) among grid-cell lists in the k level (where $1 \leq k \leq n$) becomes a unit grid-cell, a substep of creating nodes for dimensions (v+1) to n as a child of the unit grid-cell in the (k+1) level. The grid-cell in the grid-cell list for the dimension v in the k level may manage the distribution statistics of data elements within the range of a k-dimensional data space where the range of its data space intersects grid-cells in a path from the root to the node containing it.

According to another aspect of the present invention, there is provided an apparatus for finding a cluster in a data stream as an infinite data set having data elements, which are continuously generated. The apparatus includes: a memory that stores grid-cells in order that statistical distribution information on the generated data elements is managed using grid-cells, which are partitioned according to the range of a data space and have statistical distribution information of data elements within the range; a grid-cell processing unit that updates statistical distribution information of a grid-cell corresponding to a currently generated data element among the grid-cells, compares the occurrence frequency of the data element in the grid-cell according to the update result with a predefined partitioning threshold, partitions the grid-cell into a plurality of grid-cells according to the comparison result, and estimates statistical distribution information of the partitioned grid-cells; and a cluster search unit that, after the grid-cell processing unit is executed until the grid-cell becomes a unit grid-cell having a predefined size, compares the occurrence frequency of a data element in the unit grid-cell with a predefined minimum support and defines a set of a plurality of unit grid-cells as a cluster according to the comparison result.

The statistical distribution information of the data elements may be managed using the grid-cells, nodes containing the grid-cells, and a grid-cell list, in which the nodes are connected with each other.

When the data space is an n-dimensional data space (where $n \geq 2$), the grid-cell list may exist for each level in each dimension. In this case, if a grid-cell in a grid-cell list corresponding to a k level (where $1 \leq k \leq n-1$) becomes the unit grid-cell, the grid-cell processing unit may create a node corresponding to a (k+1) level as a child of the unit grid-cell. The grid-cell corresponding to the k level may manage distribution statistics of data elements within the range of a k-dimensional data space where the range of its data space intersects grid-cells in a path from the root to the node containing it.

The node may include information about the range of a data space corresponding to each grid-cell therein, a pointer to a node connected thereto, and a pointer to its child node.

When the number of partitioned grid-cells exceeds a memory space of a node containing the partitioned grid-cells, the grid-cell processing unit may create a new node and distribute the partitioned grid-cells into the nodes.

The grid-cell processing unit may compare the occurrence frequency of the data element in the grid-cell according to the update result of the statistical distribution information with a predefined merging threshold and merge the grid-cell with neighboring grid-cells according to the comparison result.

The grid-cell processing unit may compare the occurrence frequency of the data element in the grid-cell with a predefined merging threshold periodically or according to an available space of the memory and merge the grid-cell with neighboring grid-cells according to the comparison result.

The grid-cell processing unit may apply a decay rate to the currently generated data element to update the statistical distribution information such that the weight of the recently generated data element becomes larger than the weight of the previously generated data element.

The apparatus may further include a memory management unit that compares a memory space for storing the grid-cell with a first predefined limit and increases the size of the unit grid-cell according to the comparison result, or compares the memory space with a second predefined limit and decreases the size of the unit grid-cell according to the comparison result.

When the data space is an n-dimensional data space (where $n \geq 2$), a subcluster that is a cluster in a sub-data space, which is a data space formed by a subset of n dimensions, may be found.

When the subcluster is found, in a predefined dimension sequence of n dimensions, a grid-cell list may exist in the memory for each dimension in a first level. If a grid-cell in a grid-cell list for dimension v (where $k \leq v \leq n$) among grid-cell lists in the k level (where $1 \leq k \leq n$) becomes a unit grid-cell, the grid-cell processing unit may create nodes for dimensions (v+1) to n as a child of the unit grid-cell in the (k+1) level. The grid-cell in the grid-cell list for the dimension v in the k level may manage the distribution statistics of data elements within the range of a k-dimensional data space where the range of its data space intersects grid-cells in a path from the root to the node containing it.

According to still another aspect of the present invention, there is provided a computer-readable recording medium having recorded thereon a program, which executes a method of finding a cluster in a data stream as an infinite data set having data elements, which are continuously generated.

According to the present invention, in order to meet changes in application environments and demands, it is possible to efficiently provide clusters and subclusters from the data stream in real time with a limited memory space in a data stream environment containing a set of data elements, which are continuously generated.

BRIEF DESCRIPTION OF THE DRAWINGS

FIGS. 1A and 1B show a procedure, in which a grid-cell list of order m=5 is dynamically generated when h=4, according to an embodiment of the present invention;

FIG. 2A shows a grid-cell list in a two-dimensional x-y data space according to an embodiment of the present invention;

FIG. 2B shows a range of an x-y data space according to a grid-cell tree shown in FIG. 2A;

FIG. 3 is a flowchart illustrating a method of finding a cluster in a data stream according to an embodiment of the present invention;

FIG. 4 is a flowchart showing Step 345 shown in FIG. 3 in detail;

FIG. 5 is a flowchart showing Step 340 shown in FIG. 3 in detail;

FIG. 6 is a flowchart illustrating a memory space optimization procedure according to an embodiment of the present invention;

FIG. 7 is a graph showing a weight of a data element according to a decay rate;

FIG. 8A shows a three-dimensional data space X×Y×Z and an example of each subcluster to be generated therein;

FIG. 8B shows an example where a grid-cell tree of order 4 of a data stream in a three-dimensional data space X×Y×Z is generated so as to find a cluster; and FIG. 9 is a block diagram of an apparatus for finding a cluster in a data stream according to an embodiment of the present invention.

DESCRIPTION OF EXEMPLARY EMBODIMENT

Hereinafter, an exemplary embodiment of the present invention will be described in detail with reference to the accompanying drawings. It should be noted that the same components are represented by the same reference numerals even if they are shown in different drawings. In the embodiment of the present invention, detailed description of known structures and functions incorporated herein will be omitted when it may make the subject matter of the present invention unclear.

First, the symbols used herein are defined as follows.

i) In a given data stream D for a d-dimensional data space $N=N_1 \times \ldots \times N_d$, a data element generated at the j-th turn is denoted by $e^j=<e_1^j, e_2^j, \ldots, e_d^j>$ and $e_i^j \in N_i$ ($1 \leq i \leq d$).

ii) When $e^t$ is generated at the t-th turn, the current data stream $D^t$ is defined by a set of data elements that are generated so far, that is, $D^t=\{e^1, e^2, \ldots, e^t\}$, and the number of data elements in the current data stream $D^t$ is denoted by $|D^t|$.

According to the embodiment of the present invention, statistical distribution information of generated data elements is managed using grid-cells, which are partitioned according to the range of a data space and have statistical distribution information of data elements within the range. In addition, the statistical distribution information of the data elements is managed using the grid-cells, nodes containing the grid-cells, a grid-cell list, in which the nodes are connected with each other, and a grid-cell tree, in which the grid-cell list is formed in each level.

Hereinafter, the creation and managing of a grid-cell list in a one-dimensional data space, and the creation and managing of a grid-cell tree in a multi-dimensional data space will be described, and then a method and apparatus for finding a cluster according to an embodiment of the present invention will be described.

1. Creation and Management of Grid-Cell List in One-Dimensional Data Space

According to the embodiment of the present invention, a cluster is found over a data stream in a one-dimensional data space using a grid-cell list. Specifically, grid-cells dynamically partitioned according to the distribution of data elements manage statistical distribution information of data elements within the corresponding range using the grid-cell list. Therefore, it is possible to efficiently find a cluster without storing and searching data elements, compared with the known clustering algorithms. First, given a predefined partitioning factor h, the range range(N) of the one-dimensional data space N is partitioned into h equal-size initial grid-cells $G=\{g_1, g_2, \ldots, g_h\}$ (where $$\bigcup_{i=1}^{h} g_i \cdot I \equiv \text{range}(N)$$

and $g_i.I \cap g_j.I = \Phi$ ($i \neq j$, $1 \leq i, j \leq h$). A grid-cell $g_i$ manages statistical distribution information of data elements that are in its interval $g_i.I$. The grid-cell $g_1$ is defined as follows.

1.1. Definition of Grid-Cell g(I, c, μ, σ)

A grid-cell $g(I, c^t, \mu^t, \sigma^t)$ for the data stream $D^t$ denotes statistical distribution information of data elements in the interval g.I of a grid-cell g. When $D_g^t$ is a set of data elements within the range RS of the grid-cell g, that is, $D_g^t=\{e|e \in D^t$ and $e \in R(g)\}$, the statistical distribution information of the grid-cell g may be defined as follows.

i) $g.c^t$: the number of data elements in $D_g^t$
ii) $g.\mu^t$: the average of the data elements in $D_g^t$ $$g \cdot \mu^t = \sum_{j=1}^{c^t} e^j / c^t$$

iii) $g.\sigma^t$: the standard deviation of the data elements in $D_g^t$ $$g \cdot \sigma^t = \sqrt{\sum_{j=1}^{c^t} (e^j - g \cdot \mu^t)^2 / c^t}$$

When the support of a grid-cell, that is, the ratio of the data elements generated in the grid-cell to the total number of data elements in the data stream, that is, $g.c^t/|D^t|$, is equal to or greater than a predetermined partitioning threshold $S_{par}$, the grid-cell is partitioned into h smaller equal-size grid-cells. Such partitioning is recursively performed on the grid-cells in which the occurrence frequency of the data element is high. Among the grid-cells, there exists ordering relationship according to the interval of a grid-cell. For the grid-cells $G=\{g_1, g_2, \ldots, g_v\}$ in the data space N, $<(g_i, g_j)$ is an ordering function, that is, $g_i(I, c, \mu, \sigma) < g_j(I, c, \mu, \sigma)$ if $g_i.I < g_j.I$. In order to efficiently manage the grid-cells which are dynamically generated, the grid-cell list may be defined as follows.

1.2. Definition of Grid-Cell List S

A grid-cell list S of order m of the data stream $D^t$ in the one-dimensional space N is defined as follows.

1) The grid-cell list $S=<E_1, E_2, E_3, \ldots, E_p>$ has a structure of a single linked list having nodes $E_1, E_2, \ldots,$ and $E_p$.

2) A node $E_i$(min, max, G[1, \ldots, m], next_ptr) manages the following.

i) slots in G[1, \ldots, m] can hold at most m grid-cells.

ii) when v (<m) grid-cells are stored in the node, the range range(E) of the node is defined by $$\text{range}(E) = \bigcup_{i=1}^{v} G[i] \cdot I$$

([min, max), min=G[1].I.s, max=G[v].I.f). In addition, the grid-cells in the node are ordered such that G[i].I<G[j].I ($1 \leq i < j \leq v$) becomes true.

iii) next_ptr: a pointer to a next node.

3) The range of the grid-cell list S is defined by the union of the ranges of all the nodes, and it is the same as the range of the one-dimensional data space N. That is, the following relationship is satisfied.

$$\text{range}(S) = \bigcup_{i=1}^{p} \text{range}(E_i) = \text{range}(N)$$

4) Except for the first node, all nodes have at least $\lceil(m-h+2)/2\rceil$ at all times.

As a new data element $e^t$ is generated, a grid-cell whose interval includes the data element $e^t$ is searched in the grid-cell list. Subsequently, the statistical distribution information of the data elements in the grid-cell g is updated. When the statistical distribution information of the grid-cell g was updated at the v-th turn (v<t), the statistical distribution information may be updated by $e^t$ according to Equation 1.

$$g \cdot c^t = g \cdot c^v + 1 \qquad \text{[Equation 1]}$$

$$g \cdot \mu^t = \frac{g \cdot \mu^v \times g \cdot c^v + e^t}{g \cdot c^t}$$

$$g \cdot \sigma^t = \sqrt{\frac{g \cdot c^v}{g \cdot c^t} \times (g \cdot \sigma^v)^2 + \frac{(g \cdot \mu^v)^2 + (e^t)^2}{g \cdot c^t} - (g \cdot \mu^t)^2}$$

If the occurrence frequency of the data element in the grid-cell, that is, the support $g.c^t/|D^t|$, which was less than the predefined partitioning threshold $S_{par}$, becomes equal to or greater than $S_{par}$, the grid-cell g is partitioned into h smaller equal-size grid-cells $g_1, \ldots,$ and $g_h$, and statistical distribution information in the interval of each partitioned grid-cell is estimated. At this time, among the partitioned grid-cells $g_1, \ldots,$ and $g_h$, the distribution statistics of the j-th grid-cell $g_j$ ($1 \leq j \leq h$) may be estimated from the normal distribution function of g, $$\varphi(x) = \frac{1}{\sqrt{2\pi} g_j \cdot \sigma^t} e^{-\frac{(x-g_j \cdot \mu^t)^2}{2(g_j \cdot \sigma^t)^2}},$$

by Equation 2.

$$g_j \cdot c^t = g \cdot c^t \times \int_{g_j \cdot s}^{g_j \cdot f} \varphi(x) dx \qquad \text{[Equation 2]}$$

$$g_j \cdot \mu^t = \int_{g_j \cdot s}^{g_j \cdot f} x\varphi(x) dx$$

$$g_j \cdot \sigma^t = \sqrt{\int_{g_j \cdot s}^{g_j \cdot f} (x\varphi(x))^2 dx - (g_j \cdot \mu)^2}$$

FIGS. 1A and 1B show a procedure, in which a grid-cell list of order m=5 is dynamically generated when h=4, according to an embodiment of the present invention. FIG. 1A shows a grid-cell list in a data stream $D^t$, and FIG. 1B shows a grid-cell list in a data stream $D^{t+1}$.

Referring to FIG. 1B, a grid-cell $g_2$ is partitioned into four grid-cells $g_{21}, g_{22}, g_{23},$ and $g_{24}$. At this time, the statistical distribution information of $g_{22}$ may be calculated by Equation 3.

$$g_{22} \cdot c^t = g_2 \cdot c^t \times \int_{g_{22} \cdot s}^{g_{22} \cdot f} \varphi(x) dx \qquad \text{[Equation 3]}$$

$$g_{22} \cdot \mu^t = \int_{g_{22} \cdot s}^{g_{22} \cdot f} x\varphi(x) dx$$

$$g_{22} \cdot \sigma^t = \sqrt{\int_{g_{22} \cdot s}^{g_{22} \cdot f} (x\varphi(x))^2 dx - (g_{22} \cdot \mu)^2}$$

The partitioning procedure is recursively performed until the partitioned grid-cell becomes a unit grid-cell which is the smallest size λ.

2. Creation and Management of Grid-Cell Tree in Multi-Dimensional Data Space

In a multi-dimensional data stream of a multi-dimensional space $N=N_1 \times \ldots \times N_d$, in which data elements are continuously generated, a grid-cell is a space defined by intervals of d dimensions, that is, $RS=I_1 \times I_2 \times \ldots \times I_k$ (where $k \leq d$ and $I_i$ is an interval in the dimension $N_i$). Like a node of a grid-cell list, a node in the d-dimensional data space stores grid-cells, each of which manages statistical distribution information of data elements in its interval, and the intervals of the grid-cells. In addition, the node manages a pointer U[1, \ldots, m] to a child node. A grid-cell tree having those nodes is defined as follows.

2.1. Definition of Grid-Cell Tree

Given a predefined dimension sequence $<N_1, \ldots, N_d>$, a grid-cell tree of order m is defined for the data stream $D^t$ of a d-dimensional data space as follows.

1) A node of a grid-cell tree maintains the following.

i) E<min, max, G[1, \ldots, m], next_ptr> ii) a pointer U[1, \ldots, m] ($1 \leq i \leq m$) to a child node

2) If a node p in the k level is defined as a child node U[i] of a node q in the (k−1) level, i) the node p becomes the first node of a new grid-cell list S.

ii) G[i] is called the parent grid-cell of the grid-cell list S.

3) Given a k-dimensional grid-cell $G[i]=g^k(I, c, \mu, \sigma)$ in the k level of a grid-cell tree, i) the ancestor grid-cell Ancestor $(g^k)=\{g^1, \ldots, g^{k-1}\}$ of the grid-cell $g^k$ is defined as the set of the parent grid-cells. The data space of the grid-cell $g^k$ is $RS(g^k)=g^1.I\times g^2.I\times \ldots \times g^{k-1}.I\times g^k.I$. A grid-cell $g^k$ in the k level manages the distribution statistics of data elements within the range of a k-dimensional data space where the range of its data space intersects grid-cells in a path from the root to the node containing it.

ii) when $D_g^t$ is the set of the data elements in the data space $RS$ of the grid-cell $g^k$ in the data stream $D^t$, that is, $D_g^t=\{e|e\in D^t$ and $e\in R(g^k)\}$, the distribution statistics of the data elements in the data space $RS(g^k)$ is managed by the grid-cell $g^k(I, c, \mu, \sigma)$.

First, given a dimension sequence $<N_1, \ldots, N_d>$ and a partitioning factor h, a one-dimensional grid-cell list $S^1$ is created from the data space $N_1$. Initially, a grid-cell list having h initial grid-cells and $\lceil h/m \rceil$ nodes is created. As descried above, a grid-cell, in which the occurrence frequency of the data element is high, is partitioned into h smaller grid-cells.

For the smallest grid-cell $g^1$ in the grid-cell list $S^1$, the grid cell $g^1$ creates a child node in a next level of the grid-cell tree. The child node is created as a node of a new grid-cell list in a two-dimensional space $g^1.I\times N_2$. Given a grid-cell $g^2(I, c, \mu, \sigma)$ in the second level and a parent grid-cell $q^1(I, c, \mu, \sigma)$ in the grid-cell tree, the interval of the parent grid-cell $q^1$ is defined by $q^1.I\times g^2$. When the frequency of the data element in the grid-cell $g^2$ becomes high, as described above, the grid-cell $g^2$ is partitioned into h micro grid-cells.

FIG. 2A shows a grid-cell list in a two-dimensional x-y data space according to an embodiment of the present invention. Referring to FIG. 2A, a new child node and a grid-cell list containing the new child node are created from the smallest grid-cells $g_{x21}$ and $g_{x24}$. With this procedure, the grid-cell tree becomes a multi-dimensional grid-cell tree corresponding to the order of the data space. FIG. 2B shows the range of an x-y data space according to a grid-cell tree shown in FIG. 2A.

FIG. 3 is a flowchart illustrating a method of finding a cluster in a data stream according to an embodiment of the present invention. The method according to this embodiment is to find a cluster based on the above-described grid-cell, grid-cell list, and grid-cell tree.

At Step 310, a newly generated data element in a data stream is input.

At Steps 315 and 320, a grid-cell corresponding to a data element generated in the first level of a grid-cell list is searched.

At Step 325, the statistical distribution information of the grid-cell searched at Step 320 is updated. At this time, the distribution statistics of the grid-cell may be updated by Equation 1.

At Step 330, it is determined whether or not the support of a data element in the grid-cell is equal to or greater than a partitioning threshold $S_{par}$. If so, the process progresses to Step 345. Otherwise, the process progresses to Step 335.

At Step 345, the grid-cell is partitioned into a plurality of grid-cells, and the statistical distribution information of the partitioned grid-cells is estimated. At this time, the distribution statistics may be estimated by Equation 2. However, at Step 345, if the grid-cell is a unit grid-cell having a size $\lambda$, the grid-cell is not partitioned longer.

At Step 335, it is determined whether or not the support of the data element in the grid-cell is less than or equal to a predefined merging threshold $S_{mer}$. If so, the process progresses to Step 340. Otherwise, the process progress to Step 350.

At Step 340, the grid-cell is merged with neighboring grid-cells, each of which has the support less than or equal to the merging threshold $S_{mer}$. If the support of the grid-cell is less than or equal to the merging threshold $S_{mer}$ ($c^t/|D^t|\leq S_{mer}$), it can be seen that there is little possibility a cluster exists within the interval of the grid-cell. Accordingly, like Steps 335 and 340, by merging these grid-cells, the number of unnecessary grid-cells having no relation with a cluster can be reduced, and thus the memory usage can be reduced.

At Step 350, it is determined whether or not a grid-cell list in the next level to the level searched at Step 320 exists. If so, at Step 395, k is incremented by '1', and Steps 320 to 345 are recursively performed in the next level of the grid-cell list. Otherwise, the process progresses to Step 310, and a newly generated data element in the data stream is input. Then, the process progresses to Step 360.

At Step 360, whether or not the unit grid-cell having the size $\lambda$ exists and the occurrence frequency of a data element in the unit grid-cell, that is, the support $g.c^t/|D^t|$ is greater than or equal to a predefined minimum support $S_{min}$ is monitored.

At Step 365, the set of neighboring unit grid-cells as the monitoring result at Step 360 is defined as the cluster.

FIG. 4 is a flowchart showing Step 345 shown in FIG. 3 in detail.

At Step 410, the grid-cell is partitioned to create a plurality of grid-cells.

At Step 420, the statistical distribution information of each created grid-cell is estimated.

At Step 430, it is determined whether or not the number of partitioned grid-cells exceeds a memory space of a node containing the partitioned grid-cells. If so, at Step 440, the partitioned grid-cells are distributed into neighboring nodes, or a new neighboring node is created and part of the partitioned grid-cells are distributed into the neighboring node.

At Step 410, when the grid-cell is partitioned, if the number of a grid-cell in a node is larger than the memory space m of the node, it can be seen that the node is overflowed. When a node E is overflowed, like Step 440, the grid-cells may be redistributed into the neighboring nodes, or when redistribution is impossible, a new node may be created, and part of the grid-cells may be distributed into the new node. For example, if the node E is overflowed, when the number of grid-cells that can be stored in the node E and a subsequent node E' is larger than or equal to h−1, the grid-cells partitioned at Step 410 and existing grid-cells in the nodes E and E' may be evenly distributed into the nodes E and E'. Meanwhile, when the number of grid-cells that can be stored in the node E' is less than h−1, the redistribution is impossible. Accordingly, in this case, a now node $E^{new}$ may be created neighboring the node E, and the partitioned grid-cells and the grid-cells in the node E may be distributed into the nodes E and $E^{new}$.

FIG. 5 is a flowchart showing Step 340 shown in FIG. 3 in detail.

At Step 520, grid-cells neighboring the grid-cell in a merging range are found. When the grid-cells are merged, it is preferable to merge only grid-cells partitioned from the same grid-cell. If the grid-cell is partitioned into h smaller equal-size grid-cells, the merging range of the grid-cells in the one-dimensional data space N may be defined by Equation 4.

$$\left(\left\lfloor \frac{g \cdot s}{h \cdot |g \cdot I|} \right\rfloor \times h \cdot |g \cdot I|, \left\lfloor \frac{g \cdot f}{h \cdot |g \cdot I|} \right\rfloor \times h \cdot |g \cdot I|\right) \quad \text{[Equation 4]}$$

At Step 530, the grid-cells are merged, and the statistical distribution information of the merged grid-cells is updated.

At Step 540, it is determined whether or not a grid-cell to be merged exists, and if it is determined that a grid-cell to be merged exists, the process returns to Step 520.

At Step 530, when the grid-cells are merged, if the number of grid-cells in a node is less than the minimum number of grid-cells in the node, that is, $\lceil (m-h+2)/2 \rceil$, it can be seen that the node is underflowed. When the node E is underflowed, the grid-cells in a neighboring node may be redistributed. For example, when the node E is underflowed, the grid-cells in a neighboring node E' may be redistributed. At this time, when the total number of grid-cells in the nodes E and E' is larger than or equal to $\lceil m-h+2 \rceil$, the grid-cells in the nodes may be evenly redistributed into the nodes. Meanwhile, when the redistribution is impossible, the grid-cells in the two nodes are all stored in the node E, and the node E' is eliminated from the grid-cell list.

FIG. 6 is a flowchart a memory space optimization procedure according to an embodiment of the present invention. Each step shown in FIG. 6 may be performed between the steps shown in FIG. 3, or may be periodically performed.

While the data stream is infinitely increased, the memory space for storing the above-described grid-cell structure is finite. For this reason, according to this embodiment, the size $\lambda$ of the unit grid-cell is adaptively adjusted according to an available memory space.

At Step 610, it is determined whether or not an available memory space for storing grid-cells is less than or equal to a first predefined limit. If so, the process progresses to Step 620, the size $\lambda$ of the unit grid-cell is increased, and neighboring unit grid-cells are merged. For example, when the available memory space is less than or equal to a predefined value $\alpha$, the size $\lambda$ is adjusted to $\lambda * h$, and neighboring unit grid-cells are merged to have a size $\lambda * h$, such that the available memory space is larger than or equal to $\alpha$.

At Step 610, when the available memory space for storing the grid-cells is larger than the first limit, the process progresses to Step 630, and it is determined whether or not the available memory space for storing the grid-cells is larger than or equal to a second predefined limit. If so, the process progresses to Step 640, the size of the unit grid-cell is decreased. For example, if the available memory space for storing the grid-cells is h times larger than the current memory usage, the size $\lambda$ of the unit grid-cell is adjusted to $\lambda/h$, such that a micro cluster can be found by the utilization of the available memory space.

According to an embodiment of the present invention, at Step 325 shown in FIG. 1, that is, the step of updating the distribution statistics of the grid-cells, a decay rate may be applied to the currently generated data element update the distribution statistics such that the weight of a recently generated data element becomes larger than the weight of a previously generated data element. This will be described below in detail.

To find recent clusters in a data stream, the weight of each data element may be differentiated according to its generation time. That is, the older a data element becomes, the less its information influences the current result of clustering. FIG. 7 is a graph showing the weight of a data element according to a decay rate. Referring to FIG. 7, (a) shows a case in which the same weight is applied regardless of the generation time of the data element, and (b) shows a case in which only the weight of each data element in a predefined window size from current. However, in case of (b), since the weight of the data element is differentiated according to its generation time, the data elements that do not exist in the recent data stream may be regarded as the cluster. Accordingly, when a new data element is generated, it is necessary to check whether or not the stored old data elements are valid and exclude the data elements out of the window from the current analysis result.

According to an embodiment of the present invention, to find a cluster in the recent data stream, a decay rate algorithm may be used that gradually decreases the weight of the data element. A decay rate may be determined by a decay base b and a decay period w. When the weight of the recently generated data element is set to '1', the decay period w means a time until the weight of the data element is decreased to 1/b. The decay rate $\tau$ is represented by Equation 5.

$$\tau = b^{-(1/w)} (b>1,\ w \geq 1,\ b^{-1} \leq \tau < 1) \qquad \text{[Equation 5]}$$

When the values b and w are both set to '1', the information of the data element is not decayed, and is applied regardless of the time. In FIG. 1, (c) shows the weight of a data element that is decayed as time goes by. The older the data element is, the more the weight of the data element is decayed. Accordingly, it is possible to efficiently find a cluster in the recent data stream.

As described above, when the decay rate is applied, the definition of the grid-cell in the section 1.1 may be corrected as follows.

In the d-dimensional data stream $D^t$, $g(RS,\ c^t,\ \mu^t,\ \sigma^t)$ denotes the statistical distribution information of data elements in the space RS of the grid-cell g. For the set of data elements in the grid-cell g, $D_g^t = \{e | e \in D^t \text{ and } e \in R(g)\}$, the statistical distribution information of the grid-cell g is defined as follows.

i) $c^t$: the decayed count of data elements in $D_g^t$ $$c^t = \sum_{j=1}^{c^t} \tau^{(t-j)}$$

ii) $\mu^t = \langle \mu_1^t, \ldots, \mu_d^t \rangle$: the average $\mu_i^t$ in the dimension i of the data elements in $D_g^t$ $$\mu_i^t = \sum_{j=1}^{c^t} e_i^j \times \tau^{(t-j)} / c^t \quad (1 \leq i \leq d)$$

iii) $\sigma^t = \langle \sigma_1^t, \ldots, \sigma_d^t \rangle$: the standard deviation $\sigma_1^t$ in the dimension i of the data elements in $D_g^t$ $$\sigma_i^t = \sqrt{\sum_{j=i}^{c^t} (e_i^j \times \tau^{(t-j)} - \mu_i^t)^2 / c^t} \quad (1 \leq i \leq d)$$

For a data element $e^t$ generated in the recent data stream $D^t$, an initial grid-cell g containing the data element $e^t$ among the initial grid-cells is searched. A grid-cell $g(RS,\ c^v,\ \mu^v,\ \sigma^v)$ that is updated by a data element previously generated at the v-th turn ($v \leq t$) may be updated to $g(RS,\ c^t,\ \mu^t,\ \sigma^t)$ by the data element $e^t$ according to Equation 6.

$$c^t = c^v \times \tau^{(t-v)} + 1 \qquad \text{[Equation 6]}$$

$$\mu_i^t = \frac{\mu_i^v \times c^v \times \tau^{(t-v)} + e_i^t}{c^t} \quad (\text{for } \forall\ i,\ 1 \leq i \leq d)$$

-continued $$\sigma_i^t = \sqrt{\frac{c^v}{c^t} \times \tau^{(t-v)} \times (\sigma_i^v)^2 + \frac{(\mu_i^v)^2 + (e_i^t)^2}{c^t} - (\mu_i^t)^2}$$

(for $\forall i, 1 \leq i \leq d$)

According to an embodiment of the present invention, in a multi-dimensional data space, that is, an n-dimensional data space ($n \geq 2$), a subcluster that is a cluster in a sub-data space, which is a data space defined by an n-dimensional subset, may be found. In this case, a flowchart illustrating a method of finding a subcluster is the same as shown in FIG. 3, except for the grid-cell tree structure. This will be described below in detail.

In an n-dimensional data space, that is, $N = N_1 \times \ldots \times N_n$, the range of a k-dimensional grid-cell ($1 \leq k \leq n$) may be defined by the set of k intervals in the dimensions. The rectangular space of the k-dimensional grid-cell defined by the dimensions $N_1, N_2, \ldots, N_k$ is $RS = I_1 \times I_2 \times \ldots \times I_k$ (where $I_1, I_2, \ldots,$ and $I_k$ is the intervals of the dimensions $N_1, N_2, \ldots,$ and $N_k$). In the rectangular space of the grid-cell, to efficiently manage the statistical distribution information of the data elements, the following grid-cell tree is used.

Hereinafter, the structure of a grid-cell tree that is used to find a subcluster will be described.

Given a predefined dimension sequence $N_1 \rightarrow N_2 \rightarrow N_3 \ldots \rightarrow N_n$, a grid-cell tree of order m in the current data stream $D^t$ of the n-dimensional data space $N = N_1 \times \ldots \times N_n$ is defined as follows.

1) A node of a grid-cell tree stores the following.
  i) E<min, max, G[1, . . . , m], next_ptr>
  ii) a pointer U[1, . . . , m] [1, . . . , n–1] to a child node: Each of m grid-cells may have at most (n–1) child nodes.
  iii) Tdim: a dimension on which its grid-cells are defined
2) If a node p in the j-th level of a grid-cell tree is a child of a grid-cell q.G[i] ($1 \leq i \leq m$) of a node q in the (j–1)th level,
  i) the node p becomes the first node of a new grid-cell list S, and is called the head node of the grid-cell list S.
  ii) the grid-cell q.G[i] is called the parent grid-cell of all the grid-cells in the grid-cell list S.
3) In a grid-cell $G[i] = g^j(I, c, \mu, \sigma)$ of a node in the j-th level of a grid-cell tree,
  i) the ancestor grid-cell $Ancestor(g^j) = \{g^1, \ldots, g^{j-1}\}$ of the grid-cell $g^j$ is denoted by the set of its ancestor grid-cells from the root to the node. The rectangular subspace $RS(g^j)$ of the grid-cell $g^j$ is $RS(g^j) = g^1.I \times g^2.I \times \ldots \times g^{j-1}.I \times g^j.I$ where $|g^i.I| = \lambda$ and $g^i.c/|D^t| \geq S_{par}$ ($1 \leq i \leq j-1$).
  ii) Let $D_g^t$ be the data elements in the interval of the grid-cell $g^j$, that is, $D_g^t = \{e | e \in D^t$ and $e \in R(g^j)\}$. The distribution statistics of the data elements in the rectangular subspace $RS(g^j)$ is managed by the grid-cell $g^j(I, c, \mu, \sigma)$. That is, the current number of data elements in $D_g^t$ is managed by $g^j.c^t$. In addition, the average and standard deviation of the data elements in $D_g^t$ are managed by $g^j.\mu$ and $g^j.\sigma$, respectively.

Given a predefined dimension sequence $N_1 \rightarrow N_2 \rightarrow N_3 \ldots \rightarrow N_n$, and a partitioning factor h, to maintain one-dimensional grid-cells in a one-dimensional data space, grid-cell lists $S_1, \ldots,$ and $S_n$ are created. First, each grid-cell list in the first level maintains h initial grid-cells, and a single node is created to form each grid-cell list. For the continuously generated data elements of a data stream, grid cells, in which the occurrence frequency of a data element is high, in each grid-cell list $S_v$ ($1 \leq v \leq n$) is partitioned into h smaller grid-cells. Whenever a new dense unit grid-cell $g_p^1(I, c, \mu, \sigma)$ (that is, $|g_p^1.I| = \lambda$ and $g_p^1.c/|D^t| \geq S_{par}$) is generated in the entry of a node in $S_v$, (n–v) new grid-cell lists are created as child nodes of the grid-cell $g_p^1(I, c, \mu, \sigma)$ in the second level of the grid-cell tree for the subsequent dimensions in the dimension sequence, that is, $N_{v+1}, \ldots,$ and $N_n$. Each of the child nodes is the head node of a new grid-cell list for two-dimensional grid-cells. The grid-cell list created for the dimension $N_l$ ($v+1 \leq l \leq n$) manages the on-going statistical distribution information of the data elements in the two-dimensional rectangular subspace $g_p^1.I \times N_l$. Given a grid-cell $g_q^2(I, c, \mu, \sigma)$ of the new grid-cell list in the second level, the two-dimensional rectangular subspace denoted by the grid-cell $g_q^2(I, c, \mu, \sigma)$ is $g_p^1.I \times g_p^2.I$.

When a grid cell in the grid-cell list for the dimension $N_l$ ($v+1 \leq l \leq n$) in the second level becomes dense, that is, when the support of the data elements becomes larger than the partitioning threshold, the grid-cell is also partitioned into h smaller grid-cells. Consequently, the number of grid-cells in the grid-cell list is increased. Furthermore, when the grid-cell becomes a dense unit grid-cell, (n–l) new grid-cell lists for the subsequent dimensions are created in the third level as the children of the dense unit grid-cell. In this way, the grid-cell tree grows up to the n-th level at most. Meanwhile, when a grid-cell g of a node in a grid-cell tree becomes sparse, that is, when the support of the data elements is less than the merging threshold, the grid-cell g is merged with neighboring grid-cells, as described above in the merging procedure. Furthermore, all of its descendent nodes are pruned since they are also sparse.

FIG. 8A shows a three-dimensional data space X×Y×Z and an example of each subcluster to be generated therein. FIG. 8B shows an example where a grid-cell tree of order 4 for a data stream in a three-dimensional data space X×Y×Z is generated when a dimension sequence is <X, Y, Z>, and a partitioning factor h is 4. Referring to FIG. 8B, three one-dimensional grid-cell lists for X, Y, and Z are created from the root. If a new data element is generated, and grid-cells $g_{x3}$ and $g_{y2}$ become dense, the grid-cells are partitioned into smaller grid-cells. If the dense unit grid-cells $g_{x31}$ and $g_{y22}$ are found, two grid-cell lists for XY and XZ subspaces are newly created as the children of the individual dense unit grid-cells. The grid cells in these grid-cell lists maintain the set of two-dimensional grid-cells that manage the statistical distribution information of the data elements in the XY and XZ subspaces. Each grid-cell may be partitioned or merged, similarly to the grid-cell in the one-dimensional grid-cell list. In the XY or XZ grid-cell list, the set of neighboring unit-grid cells whose support is greater than or equal to $S_{min}$ becomes a subcluster. In addition, for the dense unit grid-cell $g_{y23}$ in the XY grid-cell list, a new grid-cell list for an XYZ subspace is created. Meanwhile, each of the grid-cells in the XZ grid-cell list has no children.

FIG. 9 is a block diagram of an apparatus for finding a cluster in a data stream according to an embodiment of the present invention.

A memory 820 stores grid-cells such that statistical distribution information of generated data elements may be managed using grid-cells, which are partitioned according to the range of a data space and have statistical distribution information of data elements within the range. In addition, the memory 820 stores nodes containing the grid-cells, and the grid-cell list, in which the nodes are connected with each other. The statistical distribution information of the data elements is managed using the nodes and the grid-cell lists. The grid-cells, the nodes, the structure of the grid-cell list managed by the memory 820 are the same as described above, and thus the detailed descriptions thereof will be omitted. Meanwhile, in case of fining a subcluster, the memory 820 stores the above-described grid-cell list structure for finding the subcluster.

A grid-cell processing unit 810 processes the grid-cells stored in the memory 820. First, the grid-cell processing unit 810 receives a data stream from the outside, and updates the distribution statistics of a grid-cell corresponding to a currently generated data element among the grid-cells stored in the memory 820. Then, the grid-cell processing unit 810 compares the occurrence frequency of a data element in the grid-cell with a predefined partitioning threshold, partitions the grid-cell into a plurality of grid-cells according to the comparison result, and estimates the distribution statistics of the partitioned grid-cells. Meanwhile, the grid-cell processing unit 810 applies the decay rate to the currently generated data element to update the distribution statistics of the grid-cells such that the weight of the recently generated data element becomes larger than the weight of the previously generated data element.

The operation of the grid-cell processing unit 810 is the same as Steps 315 to 355 shown in FIG. 3, and thus the detailed description thereof will be omitted.

A memory management unit 840 compares the available space of the memory 820 with a first predefined limit and increases the size of the unit grid-cell according to the comparison result, or compares the available space of the memory 820 with a second predefined limit and decreases the size of the unit grid-cell according to the comparison result. The operation of the memory management unit 840 is the same as Steps 610 to 640 shown in FIG. 6, and thus the detailed description thereof will be omitted.

After the grid-cell processing unit 810 is executed until the grid-cells stored in the memory 820 become a unit grid-cell having a predefined size, a cluster search unit 830 compares the occurrence frequency of a data element in the unit grid-cell with a predefined minimum support and defines a set of unit grid-cells as a cluster according to the comparison result. The operation of the cluster search unit 830 is the same as Steps 360 and 365 shown in FIG. 3, and thus the detailed description thereof will be omitted.

As described above, according to the embodiment of the present invention, there is suggested an effective data structure to search a multi-dimensional cluster in a data stream environment, to thereby performing clustering in real time. In the exiting data mining algorithms, a finite data set is stored and recursive search is performed. Accordingly, a massive memory space is needed and a processing time becomes longer due to the recursive search. In contrast, according to the embodiment of the present invention, clustering can be performed with one-time search using a grid-cell list and a grid-cell tree having nodes, without storing a data set. That is, since only the statistical distribution information of the data elements in each range is stored by a grid-cell, fast processing can be performed regardless of the number of infinitely generated data elements.

To find the accurate range of a cluster, the grid-cell is partitioned into a plurality of smaller grid-cells or is merged based on a partitioning axis according to the distribution statistics of the data elements. At this time, the grid-cells are redistributed according to empty slots in a node, thereby efficiently adjusting the memory space. Therefore, the performance can be optimized according to the given computing resources.

The present invention can be applied to customer analysis for target marketing and company data analysis for decision making, in which the existing data mining algorithms are used. Furthermore, the present invention can be applied to real-time financial transaction and stock market analysis, real-time sensor network data stream analysis, or real-time network analysis for unauthorized access detection and security, to which the existing data mining algorithms may not be applied. Therefore, it can be efficiently used in sensor networks or various embedded apparatus for ubiquitous computing having limited computing resources, and real-time analysis for infinite massive data.

The embodiment of the present invention may be created as a program, which is executable on a computer, and may be implemented by a general-use digital computer, which runs the program using a computer-readable recording medium. Examples of the computer-readable recording medium include magnetic storage mediums (for example, ROM, floppy disk, and hard disk), optical recording mediums (for example, CD-ROM and DVD-ROM), and carrier waves (for example, transmission through Internet).

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects. The scope of the present invention is defined by the appended claims rather than by the description preceding them, and all changes and modifications that fall within metes and bounds of the claims, or equivalents of such metes and bounds are therefore intended to be embraced by the claims.

What is claimed is:

1. A computer-implemented method of finding a cluster in a data stream as an infinite data set having continuously generated data elements in a computer network, the computer-implemented method comprising the steps of:
   (a) updating statistical distribution information of a grid-cell corresponding to a currently generated data element among a plurality of grid-cells, statistical distribution information on previously generated data elements being managed using the grid-cells, wherein the grid-cells are partitioned according to the range of a data space and have statistical distribution information of data elements within the range of the data space;
   (b) comparing the occurrence frequency of the data element in the grid-cell according to the update result of the statistical distribution information with a predefined partitioning threshold, partitioning the grid-cell into a plurality of partitioned grid-cells according to the comparison result, and estimating statistical distribution information of the partitioned grid-cells;
   (c) recursively performing the step (a) or (b) until the grid-cell becomes a unit grid-cell having a predefined size; and
   (d) comparing the occurrence frequency of a data element in the unit grid-cell with a predefined minimum support and defining a set of a plurality of unit grid-cells as a cluster according to the comparison result,
   wherein one or more of the steps (a) to (d) are performed using a processor in the computer network.

2. The method of claim 1, wherein the statistical distribution information of the data elements is managed using the grid-cells, nodes containing the grid-cells, and a grid-cell list, the grid-cell list including the nodes that are connected with each other.

3. The method of claim 2, wherein:
   when the data space is an n-dimensional data space (where $n \geq 2$), the grid-cell list exists for each level in each dimension, the step (c) includes, if a grid-cell in the grid-cell list corresponding to a k level (where $1 \leq k \leq n-1$) becomes the unit grid-cell, a substep of creating a node corresponding to a (k+1) level as a child of the unit grid-cell, and the grid-cell corresponding to the k level manages distribution statistics of data elements within the range of a k-dimensional data space where the range of the k-dimensional data space intersects grid-cells in a path from a root to the node containing the grid-cell.

4. The method of claim 3,
wherein the node includes information about the range of a data space corresponding to each grid-cell therein, a pointer to a node connected thereto, and a pointer to a corresponding child node.

5. The method of claim 2,
wherein, when the number of partitioned grid-cells exceeds a memory space of a node containing the partitioned grid-cells, the step (b) includes a substep of creating a new node and distributing the partitioned grid-cells into the nodes.

6. The method of claim 1, further comprising a step of:
comparing the occurrence frequency of the data element in the grid-cell according to the update result of the statistical distribution information at the step (a) with a predefined merging threshold and merging the grid-cell with neighboring grid-cells according to the comparison result.

7. The method of claim 1, further comprising a step of:
comparing the occurrence frequency of the data element in the grid-cell with a predefined merging threshold periodically or according to a memory space for storing the grid-cell and merging the grid-cell with neighboring grid-cells according to the comparison result.

8. The method of claim 1,
wherein, in the step (a), a decay rate is applied to the currently generated data element to update the statistical distribution information such that a weight of a recently generated data element becomes larger than a weight of a previously generated data element.

9. The method of claim 1, further comprising a step of:
comparing a memory space for storing the grid-cell with a first predefined limit and increasing the predefined size according to the comparison result, or comparing the memory space for storing the grid-cell with a second predefined limit and decreasing the predefined size according to the comparison result.

10. The method of claim 2,
wherein, when the data space is an n-dimensional data space (where $n \geq 2$), a subcluster that is a cluster in a sub-data space is found, the sub-data space being a data space formed by a subset of n dimensions.

11. The method of claim 10, wherein:
when the subcluster is found, in a predefined dimension sequence of n dimensions, a grid-cell list exists for each dimension in a first level, the step (c) further includes, if a grid-cell in a grid-cell list for dimension v (where $k \leq v \leq n$) among grid-cell lists in the k level (where $1 \leq k \leq n$) becomes a unit grid-cell, a substep of creating nodes for dimensions (v+1) to n as a child of the unit grid-cell in the (k+1) level, and the grid-cell in the grid-cell list for the dimension v in the k level manages the distribution statistics of data elements within the range of a k-dimensional data space where the range of the k-dimensional data space intersects grid-cells in a path from a root to the node containing the grid-cell.

12. A non-transitory computer-readable medium containing computer instructions stored therein for causing a computer processor to perform a program for finding a cluster in a data stream, the computer-readable recording medium comprising:
(a) code for updating statistical distribution information of a grid-cell corresponding to a currently generated data element among a plurality of grid-cells, statistical distribution information on previously generated data elements being managed using the grid-cells, wherein the grid-cells are partitioned according to the range of a data space and have statistical distribution information of data elements within the range of the data space;
(b) code for comparing the occurrence frequency of the data element in the grid-cell according to the update result of the statistical distribution information with a predefined partitioning threshold, partitioning the grid-cell into a plurality of partitioned grid-cells according to the comparison result, and estimating statistical distribution information of the partitioned grid-cells;
(c) code for recursively executing the code of (a) or (b) until the grid-cell becomes a unit grid-cell having a predefined size; and
(d) code for comparing the occurrence frequency of a data element in the unit grid-cell with a predefined minimum support and defining a set of a plurality of unit grid-cells as a cluster according to the comparison result.

13. An apparatus for finding a cluster in a data stream as an infinite data set having continuously generated data elements, the apparatus comprising:
a memory that stores grid-cells such that statistical distribution information on the generated data elements is managed using the grid-cells, the grid-cells being partitioned according to a range of a data space and having the statistical distribution information of the data elements within the range of the data space;
a grid-cell processing unit that updates the statistical distribution information of a grid-cell corresponding to a currently generated data element among the grid-cells, compares the occurrence frequency of the data element in the grid-cell according to the update result with a predefined partitioning threshold, partitions the grid-cell into a plurality of partitioned grid-cells according to the comparison result, and estimates statistical distribution information of the partitioned grid-cells; and
a cluster search unit that, after the grid-cell processing unit is executed until the grid-cell becomes a unit grid-cell having a predefined size, compares the occurrence frequency of a data element in the unit grid-cell with a predefined minimum support and defines a set of a plurality of unit grid-cells as a cluster according to the comparison result.

14. The apparatus of claim 13,
wherein the statistical distribution information of the data elements is managed using the grid-cells, nodes containing the grid-cells I and a grid-cell list, the grid-cell list including the nodes that are connected with each other.

15. The apparatus of claim 14,
wherein, when the data space is an n-dimensional data space (where $n \geq 2$), the grid-cell list exists for each level in each dimension, if a grid-cell in a grid-cell list corresponding to a k level (where $1 \leq k \leq n-1$) becomes the unit grid-cell, the grid-cell processing unit creates a node corresponding to a (k+1) level as a child of the unit grid-cell, and the grid-cell corresponding to the k level manages distribution statistics of data elements within the range of a k-dimensional data space where the range of the k-dimensional data space intersects grid-cells in a path from a root to the node containing the grid-cell.

16. The apparatus of claim 15,
wherein the node includes information about the range of a data space corresponding to each grid-cell therein, a pointer to a node connected thereto, and a pointer to a corresponding child node.

17. The apparatus of claim 14,
wherein, when the number of partitioned grid-cells exceeds a memory space of a node containing the partitioned grid-cells, the grid-cell processing unit creates a new node and distributes the partitioned grid-cells into the nodes.

18. The apparatus of claim 13,
wherein the grid-cell processing unit compares the occurrence frequency of the data element in the grid-cell according to the update result of the statistical distribution information with a predefined merging threshold and merges the grid-cell with neighboring grid-cells according to the comparison result.

19. The apparatus of claim 13,
wherein the grid-cell processing unit compares the occurrence frequency of the data element in the grid-cell with a predefined merging threshold periodically or according to an available space of the memory and merges the grid-cell with neighboring grid-cells according to the comparison result.

20. The apparatus of claim 13,
wherein the grid-cell processing unit applies a decay rate to the currently generated data element to update the statistical distribution information such that a weight of a recently generated data element becomes larger than a weight of a previously generated data element.

21. The apparatus of claim 13, further comprising:
a memory management unit that compares a memory space for storing the grid-cell with a first predefined limit and increases the size of the unit grid-cell according to the comparison result, or compares the memory space with a second predefined limit and decreases the size of the unit grid-cell according to the comparison result.

22. The apparatus of claim 14,
wherein, when the data space is an n-dimensional data space (where n≧2), a subcluster that is a cluster in a sub-data space is found, the sub-data space being a data space formed by a subset of n dimensions.

23. The apparatus of claim 22, wherein:
when the subcluster is found, in a predefined dimension sequence of n dimensions, a grid-cell list exists in the memory for each dimension in a first level,
if a grid-cell in a grid-cell list for dimension v (where k≦v≦n) among grid-cell lists in the k level (where 1≦k≦n) becomes a unit grid-cell, the grid-cell processing unit creates nodes for dimensions (v+1) to n as a child of the unit grid-cell in the (k+1) level, and
the grid-cell in the grid-cell list for the dimension v in the k level manages the distribution statistics of data elements within the range of a k-dimensional data space where the range of the k-dimensional data space intersects grid-cells in a path from a root to the node containing the grid-cell.

* * * * *